United States Patent
Teagarden

[15] 3,693,818
[45] Sept. 26, 1972

[54] TRAILER STAND FOR INSTALLING AUTOMOBILE MUFFLER

[72] Inventor: Raymond E. Teagarden, 6237 Nogales St., Riverside, Calif. 92506

[22] Filed: July 27, 1971

[21] Appl. No.: 166,526

[52] U.S. Cl..................214/506, 214/85, 296/1 A, 254/3 R
[51] Int. Cl. ...........................................B60p 1/28
[58] Field of Search.......214/505, 506, 501, 85, 85.1, 214/1 A; 296/1 A; 254/3 R, 3 B, 3 C

[56] References Cited

UNITED STATES PATENTS

| | | | |
|---|---|---|---|
| 1,369,194 | 2/1921 | Sarver | 214/1 A |
| 3,613,919 | 10/1971 | Ceepo | 296/1 A X |

*Primary Examiner*—Albert J. Makay
*Attorney*—Herbert E. Kidder

[57] ABSTRACT

A portable rack for supporting an automobile at an elevated height to facilitate working on the underside thereof, consisting of a wheel-supported frame having a pair of laterally spaced, elevated tracks, and an inclined ramp hinged to its rear end for driving the car on and off. The frame tilts about its centrally located wheels between an inclined drive-on position and a level working position. At the front end of the trailer is a jack-knifing draft connection for attachment to a towing vehicle, which includes a hydraulic cylinder that slows and cushions the change from one position to the other. Except for transverse frame members at the front and rear ends, the space below and between the tracks is entirely clear, so that a workman can get at the muffler without interference from the trailer structure.

6 Claims, 11 Drawing Figures

PATENTED SEP 26 1972 3,693,818
SHEET 1 OF 4
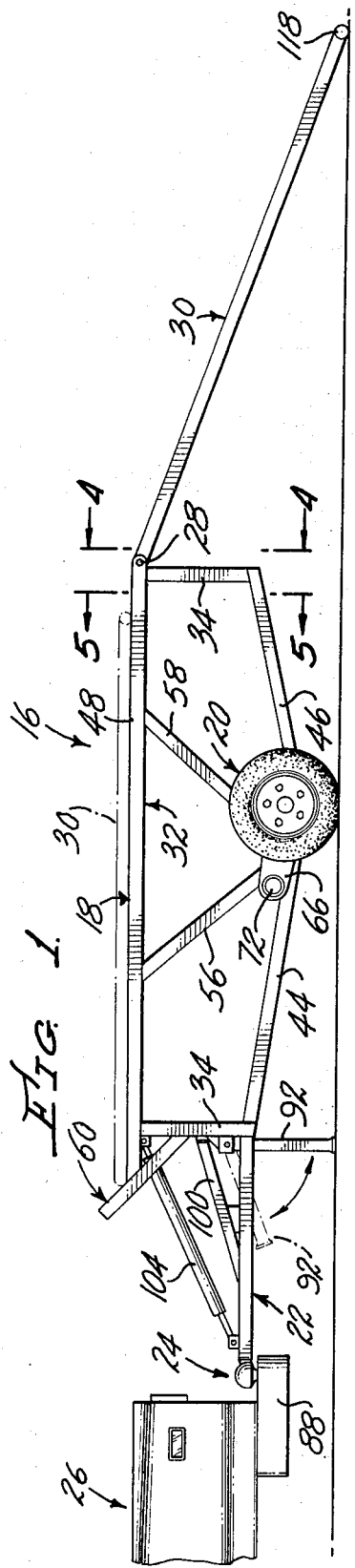
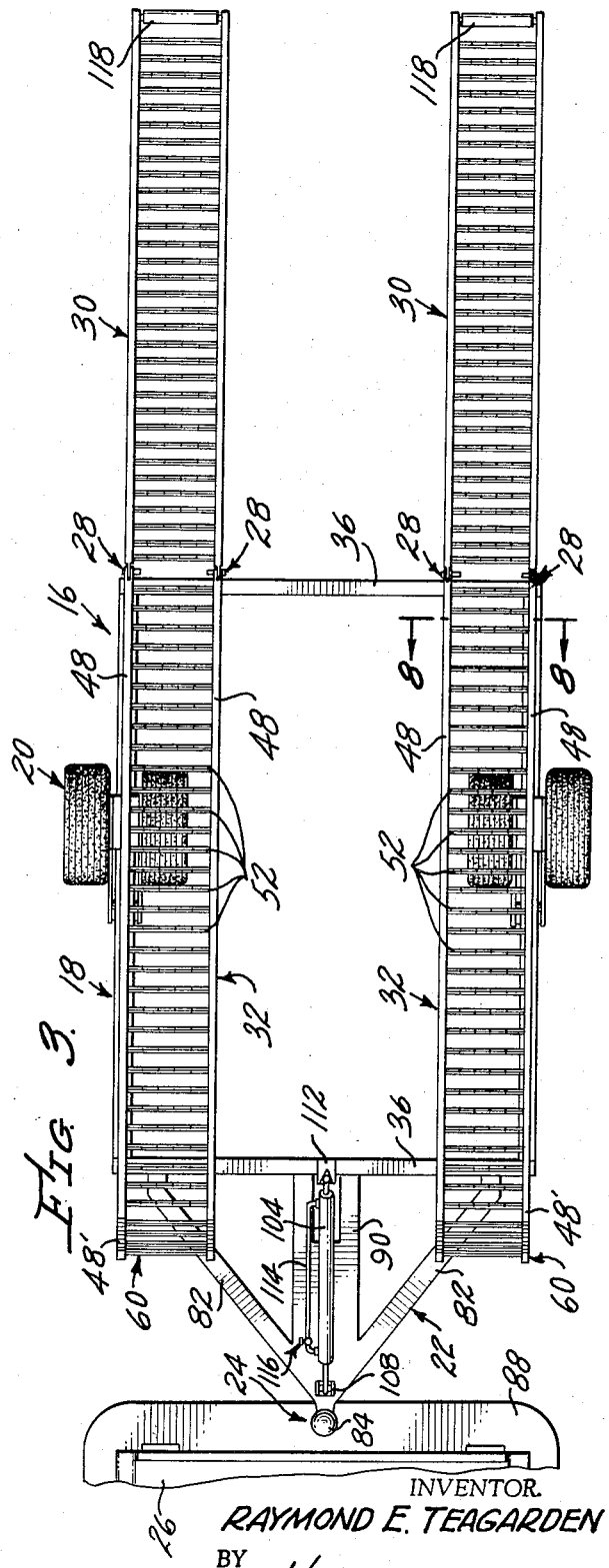
INVENTOR.
RAYMOND E. TEAGARDEN
BY Herbert E. Kidder
AGENT

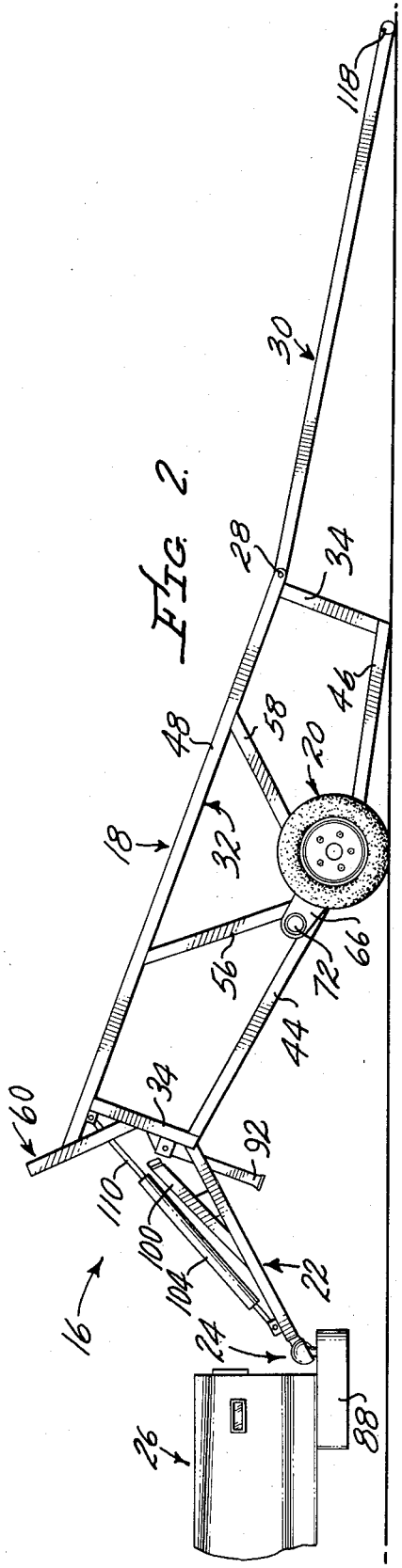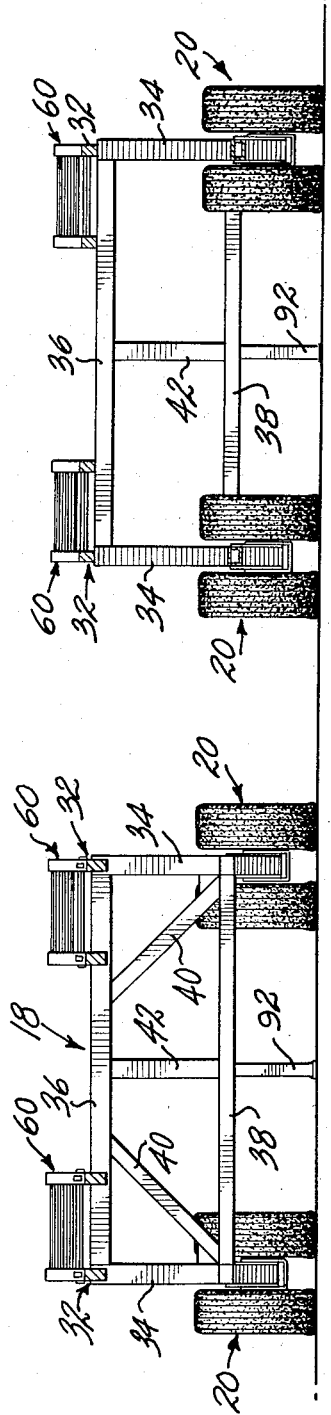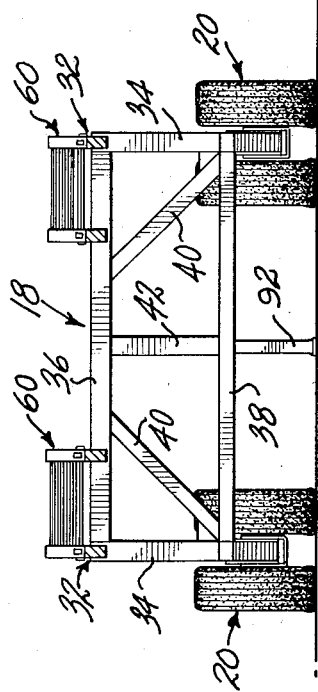

INVENTOR.
RAYMOND E. TEAGARDEN
BY Herbert E. Kidder
AGENT

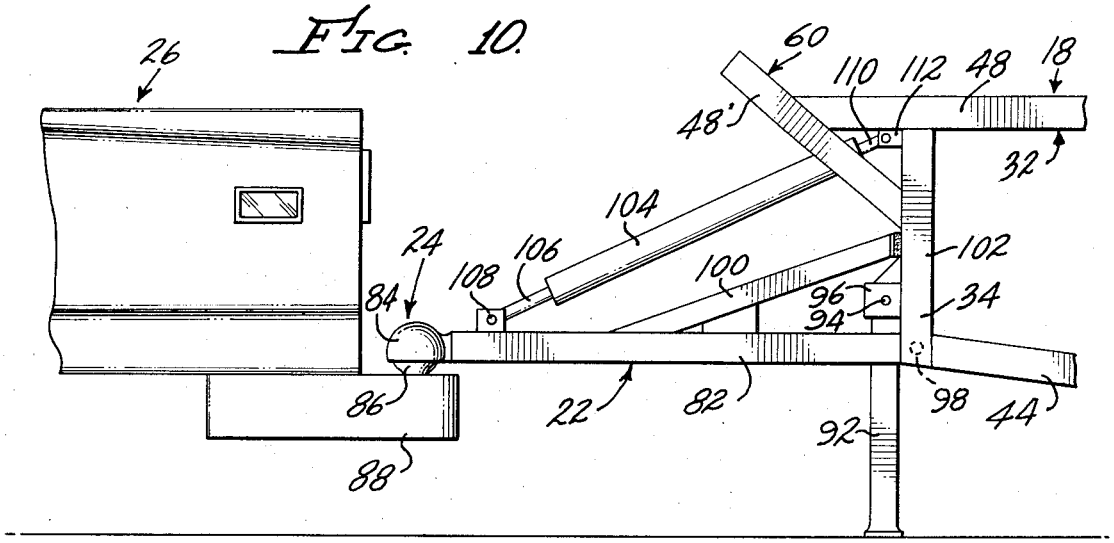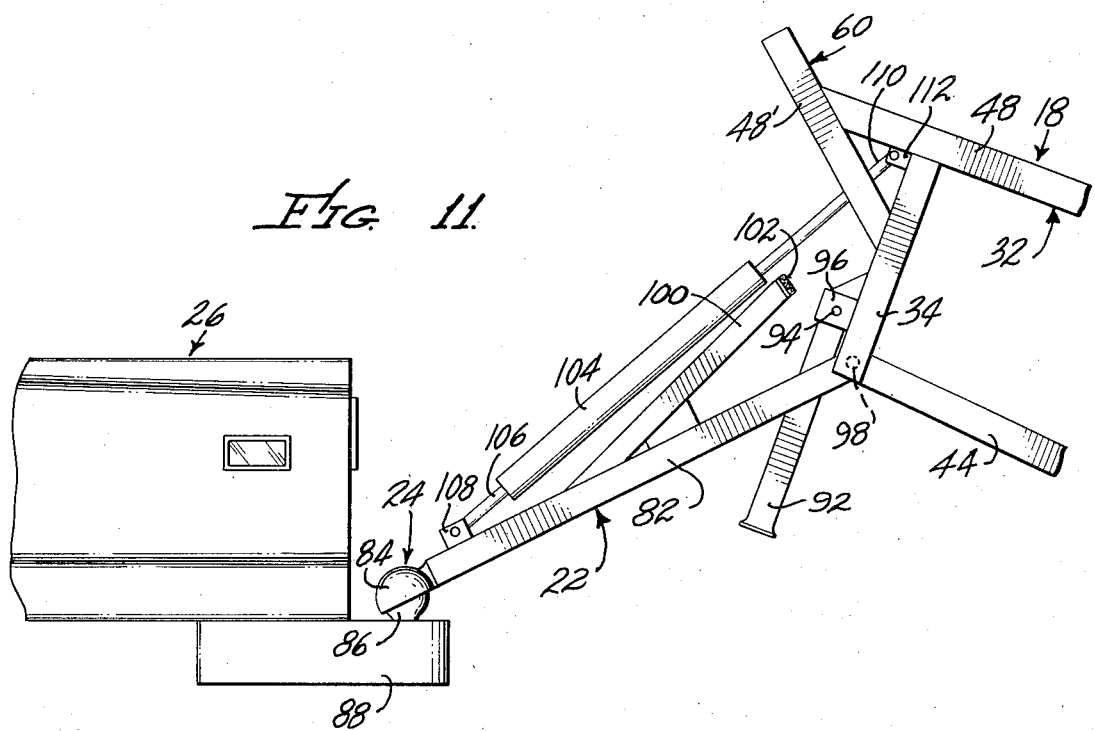

TRAILER STAND FOR INSTALLING AUTOMOBILE MUFFLER

BACKGROUND OF THE INVENTION

The present invention pertains to a trailer stand for supporting an automobile at an elevated height so as to facilitate removing the old muffler and installing a new one, or for performing any other service operation, such as lubrication, on an automobile which requires clear and convenient access to the underside thereof. Essentially, what the invention does is to provide a portable, or mobile, work rack that can be taken wherever there are automobiles in need of work on the undersides thereof, and no hydraulic lifts or pits to provide easy access to the undersides. For example, many used-car lots have automobiles that need only a minor tune-up and muffler replacement to put them in first-class condition for sale, yet the volume of work over a period of time may not be sufficient to justify the considerable expense of installing a hydraulic lift, or a concrete pit. In such a case, a muffler-installation operator equipped with the device of the invention can make the rounds of all the used-car lots within a 50 to 100 mile radius of his shop, and perform the necessary muffler replacement jobs at minimum cost and maximum convenience to the customer.

Another place where the apparatus of the present invention could be used advantageously is in thinly settled communities where there is no regular muffler service station because there are not enough cars to ensure a steady flow of muffler replacement business, which is necessary for long-term profitable operation. Here, again, the operator with the present apparatus can drive into such a community, advertise for a limited period of time so as to get all the muffler replacement business that there is to be had, and then move on to another community.

Even for the muffler service man who intends to set up a permanently established place of business, there are advantages in using the apparatus is considerably less than the cost of hydraulic or electric lifts, or concrete pits. Moreover, such equipment, once installed, becomes a part of the property and is difficult, or impossible, to remove if it should be necessary to move to another location. A further disadvantage of permanently installed lifts or pits is that they are subject to relatively high taxes as real estate improvements, whereas the present apparatus is taxed as a motor vehicle trailer and enjoys a much more favorable tax rate.

SUMMARY OF THE INVENTION

The primary object of the present invention is to provide a trailer vehicle specifically designed for use as a mobile rack to hold an automobile at an elevated height while work is being done on the underside thereof. More specifically, it is an object of the invention to provide a trailer stand that is expressly designed to provide an inclined ramp, up which the automobile to be serviced is driven, and which tilts from the inclined to the horizontal position as the car approaches the end of its drive onto the rack, thereby placing the car in a horizontal position at an elevated level, where it can conveniently be worked on.

Another object of the invention is to provide a mobile trailer stand of the class described, in which the tilting of the main frame from its inclined drive-on position to the level working position occurs automatically and without requiring the use of any mechanical or powered mechanism. This is accomplished by supporting the main frame of the trailer at about its longitudinal midpoint on transversely aligned wheels, so that the frame can rock on said wheels between said two positions responsive to movement of the center-of-gravity of the car from one side of the wheels to the other. The draft connection at the front end of the trailer is hinged to the frame so as to allow the front end to raise of lower as the frame changes from one position to the other, and a hydraulic dashpot cylinder acts as a shock absorber to slow and cushion the change in position.

A further object of the invention is to provide a mobile trailer stand having a pair of laterally spaced, elevated tracks upon which an automobile can be driven to have work performed on its underside, which is completely clear of structural members in the work area between the tracks from the front end of the stand to the rear end thereof, so that a workman can get at any part of the car, without interference from any of the structure of the trailer.

These and other objects and advantages of the invention will become apparent to those skilled in the art from the following detailed description of the preferred embodiment thereof, with reference to the accompanying drawings.

BRIEF DESCRIPTION OF THE DRAWINGS

FIG. 1 is a side elevation of a trailer stand embodying the principles of the invention, showing the same hitched to the rear end of a truck in the level working position, with the inclined ramp tracks lowered to the ground, in readiness to receive an automobile;

FIG. 2 is a similar view of the same, showing the trailer stand tilted to the drive-on position, as when an automobile has advanced part way up the inclined ramp tracks;

FIG. 3 is a top plan view of the trailer stand in the position shown in FIG. 1;

FIG. 4 is a transverse sectional view, taken at 4—4 in Fig 1;

FIG. 5 is a transverse sectional view, taken at 5—5 in Fig. 1;

FIG. 10 is a fragmentary side elevation of the draft connection joining the front end of the trailer to the towing vehicle, showing trailer stand in the horizontal working position; and FIG. 11 is a view similar to Fig. 10, showing the trailer stand in the tilted, drive-on position.

DESCRIPTION OF THE PREFERRED EMBODIMENT

Figure 6:
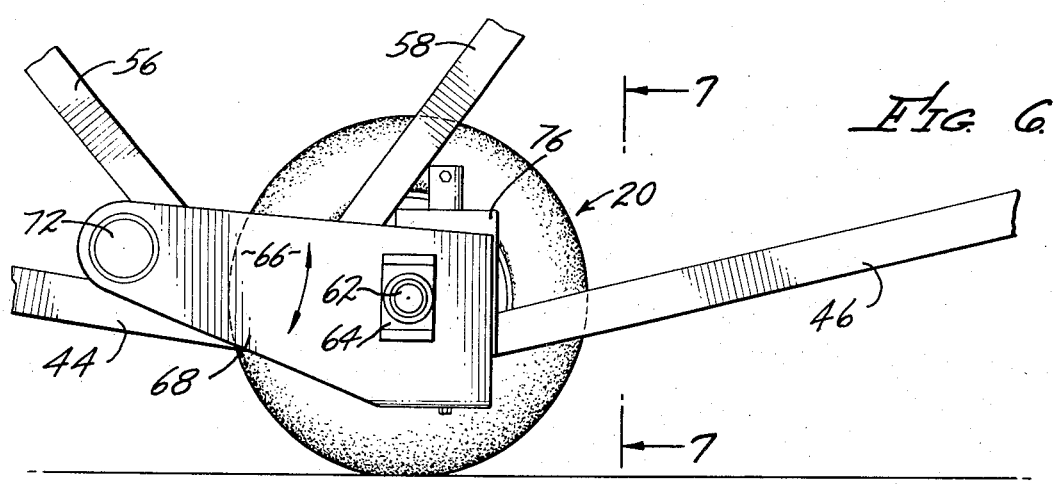
FIG. 6 is an enlarged fragmentary side elevational view of one of the wheel trucks and associated frame members, with the near wheel removed from its axle to show the construction of the pivoted arm upon which the sheels are carried.

In the drawings, the trailer stand of the present invention is designated in its entirety by the reference numeral 16, and is seen to comprise a main frame 18 supported approximately midway between its front and rear ends on two pairs of dual wheels 20. At its front end, the frame 18 is connected by a hinged draft frame 22 and ball-and-socket connection 24, to the rear end of a towing truck 26. Pivotally connected at 28 to the rear end of the trailer are two laterally spaced, inclined ramp tracks 30, which are longitudinally aligned with two horizontal supporting tracks 32 at the top of the trailer, along both side edges thereof.

The main frame 18 is preferably made of welded steel box beams, and has the generally rectangular, box-like configuration shown in the drawings. At the four corners of the frame are vertical posts 34, the two pairs at the front and rear of the frame being connected at their top and bottom ends by transverse beams 36 and 38, respectively. Diagonal bracing beams 40 extend from the bottom ends of the two rear posts to inwardly spaced points on the rear upper beam 36. At the front end of the frame, the upper and lower beams 36, 38 are connected at their midpoints by a vertical post 42.

Figure 8:
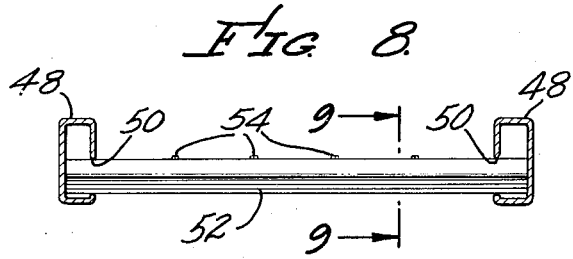
FIG. 8 is an enlarged sectional view through one of the tracks, taken at 8—8 in Fig. 3.
Figure 9:
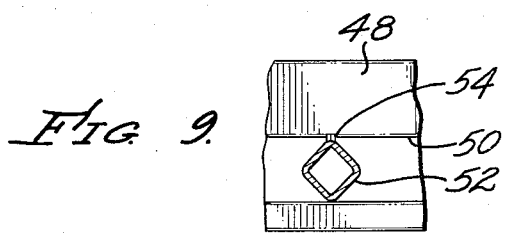
FIG. 9 is a further enlarged sectional view, taken at 9—9 in FIG. 8.

Extending rearwardly and slightly downwardly from the bottom ends of both of the front posts 34 are longitudinal bottom beams 44, which connect with the ends of other longitudinal bottom beams extending forwardly and slightly downwardly from the bottom ends of the rear post 34. The top fore-and-aft structural members of the frame 18 are formed by the two tracks 32, which extend between and are connected to the top cross members 36. Each of the tracks 32, as best shown in FIGS. 8 and 9, comprises two laterally spaced, parallel rails 48 having open slots 50 in their inwardly facing sides, into which the ends of a plurality of cross bars 52 are inserted and welded in place. The cross bars 52 are preferably made of square tubing, set on edge as shown in FIG. 9, with a plurality of small studs 54 projecting upwardly from the top edge to provide non-skid traction for the tires of the automobile driven onto the tracks. Welded to the underside of the outer rail 48 of each track are two downwardly converging bracing beams 56 and 58, the bottom ends of which meet at and are welded to the top side of beam 44. At the front ends of the tracks 32 are short track sections 60 which extend forwardly and upwardly at an angle of about 45 degrees to form limit stops, which prevent the car from being driven off the front of the tracks. The bottom ends of the outer side rails on the track sections 60 extend down to and are welded to the posts 34, for bracing.

Figure 7:
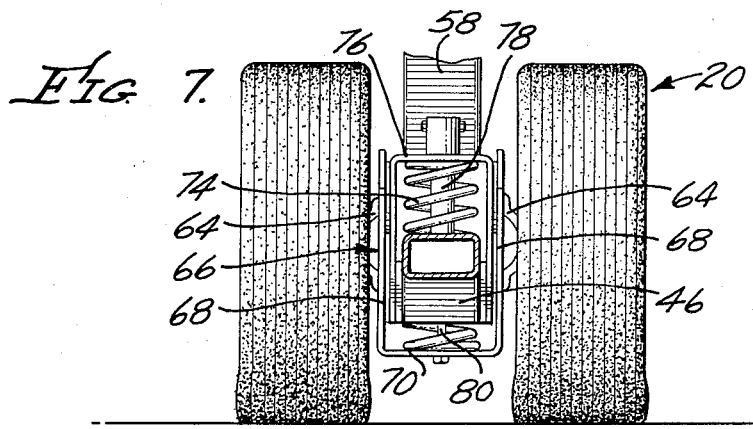
FIG. 7 is a fragmentary sectional view, taken at 7—7 in Fig. 6.

The dual wheels 20 on each side of the trailer are journaled on transversely aligned axles 62 projecting laterally from brackets 64 on opposite sides of a yoke 66 (see FIGS. 6 and 7). Yoke 66 is preferably formed of steel plate bent to provide two laterally spaced, parallel arms 68 extending in the fore-and-aft direction on opposite sides of the frame members 44, 46, 56, 58, and these are joined at their bottom rear ends by a bottom plate 70. The yoke 66 is pivoted for vertical swinging movement about a pivot axis 72, which is fixed to frame members 44, 56 and extend laterally therefrom in opposite directions.

Seated at its bottom end on the plate 70 is a coil spring 74, the top end of which bears against the underside of an inverted U-shaped bracket member 76. The arms of the bracket member 76 are welded to opposite sides of beams 44 and 46 at the adjacent ends of said beams, and there is a space between the beam ends through which the spring 74 passes. Thus, bracket 76 forms a junction between the ends of beams 44 and 46, and becomes an integral part of the frame structure at this point. The weight of the frame structure is transferred by the bracket 76 to spring 74 which, in turn, transfers the load to the wheels 20 through the yoke 66. A hydraulic shock absorber cylinder 78 is mounted on the bracket member 76 inside the spring 74, and its piston rod plunger 80 is fastened to the bottom plate 70 of yoke 66. Thus, vertical movement of the wheels 20 and yoke 66 relative to the frame 18 is damped by the shock absorber, and excessive bouncing of the trailer as it is towed over the streets by truck 26 is prevented.

The wheel truck construction just described has one important advantage, as far as the present invention is concerned, in that it eliminates the usual axle which normally extends across the full width of the trailer. Such an axle would be objectionable because it would be in the way of the workman working in the area enclosed between the side frames of the trailer and the front and back ends thereof. As clearly shown by the drawings, the space enclosed by the sides, front end and back end of the trailer is entirely clear, and the workman is free to walk about and to work with his tools on any part of the underside of an automobile standing on the tracks 18, without interference from any of the structure of the trailer. While dimensions are not critical to the invention, it is essential that tracks 18 be spaced apart laterally, centerline-to-centerline, the same distance as the average wheel tread of cars to be serviced, and that the height of the tracks above the ground be such that the workman can work without crouching down to a tiring extent. Typically, the tracks 18 might be about 4½ to 5 feet above the ground The length of the tracks 18 should be at least as long as the longest wheel base that is likely to be encountered, which might be from 120 to 144 inches.

The draft frame 22 connecting the front end of the trailer to the towing truck 26 comprises two forwardly converging beams 82 which are joined together at their front ends and have a downwardly facing socket 84 that fits over and snugly receives a ball 86 mounted on the top side of the rear bumper 88 of the truck. The socket 84 is clamped to the ball 86 by the usual clamping means (not shown) so that the draft frame 22 can swing horizontally or vertically about the ball without separating therefrom. Projecting rearwardly from the junction of the side beams 82 is a center member 90, the rear end of which is bifurcated (FIG. 3) to pass on opposite sides of a pivoted support leg 92. Leg 92 is connected by a pivot pin 94 to a bracket 96 mounted on the front side of vertical post 42, and the post is swingable between the working position shown in solid lines in FIG. 1 and the transport position shown in phantom lines. The rear ends of beams 82 and member 90 are pivoted at 98, so that the draft frame 22 can swing vertically between the two positions shown in FIGS. 10 and 11. The draft frame is prevented from swinging up above the position shown in FIG. 10, by a limit stop 100. Limit stop 100 is a fore-and-aft extending box beam that is attached at its front end to member 90 and inclines upwardly and rearwardly therefrom. There is a rubber bumper 102 on the rear end of beam 100, which abuts against center post 42 just above bracket 96. When the trailer 16 is in the horizontal working position, as shown in FIGS. 1 and 10, the bottom end of leg 92 rests on the ground, and the leg thus provides solid support for the front end of the trailer. At the same time, most of the load of the trailer is taken off the rear end of the truck, thereby sparing the rear springs of the truck from being overloaded, and at the same time providing rock-steady support for the trailer.

The change from the horizontal working position shown in FIG. 10 to the tilted drive-on position shown in FIG. 11 is checked and cushioned by a hydraulic cylinder 104, which functions in the manner of a dashpot. Cylinder 104 extends in a generally fore-and-aft direction, and at its front end is a rod 106 which is pivotally connected to a bracket 108 on the front end of draft frame 22. From bracket 108, cylinder 104 inclines upwardly and rearwardly at an angle of about 30 degrees, and projecting from its rear end is a piston rod 110, the outer end of which is pivotally connected to a bracket 112 on the front side of upper cross piece 36 at the midpoint thereof. Cylinder 104 has its ends connected by a pipe 114 (see FIG. 3), and connected into this pipe is a restrictor valve 116, which can be adjusted to regulate the flow of fluid through line 114 from one end of the cylinder to the FIG. Means (not shown) is provided within the cylinder to accommodate the unequal volumetric displacement on opposite sides of the piston resulting from the presence of the piston rod in the upper portion of the cylinder.

The inclined ramp tracks 30 are essentially the same in construction as tracks 32, and each comprises two laterally spaced side rails, with plurality of cross bars extending between them. The front ends of the rails have hinge fittings that overlap companionate hinge fittings on the rear ends of rails 48, and the two are connected by removable pins 28. Extending between the side rails at the rear ends thereof is a roller 118, which rests on the ground and allows the bottom end of the ramp track 30 to move rearwardly or forwardly as the trailer changes from one position to the other. When the trailer is to be transported from one place to another, the pivot pins 28 are removed and ramp tracks 30 are placed on top of tracks 32, as shown in phantom lines in Fig. 1.

The operation of the invention is as follows: When the trailer has been driven to the desired location, leg 92 is swung down to ground-engaging position, and inclined ramp tracks 30 are connected to the rear ends of tracks 32, as shown in FIG. 1. The automobile to be worked on is then driven forwardly up the ramp tracks 30. As the front wheels of the automobile start up the tracks 30, the weight of the car on the tracks causes the rear end of the trailer to tilt downwardly to the position shown in FIG. 2. Tilting of the trailer is resisted and checked by the hydraulic cylinder dashpot 104, which lets the rear end of the trailer down gently and slowly, until the rear ends of members 46 touch the ground.

The automobile then continues its advance up the tracks while the trailer remains in the tilted position of FIG. 2, until the center of gravity of the automobile passes over the wheels 20. At this point, the front end of the trailer tilts downwardly, (slowed by the cylinder 104) until leg 92 rests on the ground. The automobile then continues to advance along the now-horizontal tracks 32 until its front wheels come up against the inclined track sections 60, which stop the car. The car is now ready to have its muffler replaced, or any other work done on the underside thereof.

When the work has been completed, the automobile is backed slowly along the tracks 32 until its center of gravity passes rearwardly over the wheels 20, at which point the trailer tilts its rear end downwardly until bottom rear beams 46 touch the ground. The automobile is backed down the inclined tracks 32 and ramp tracks 30, until the downward pressure of the automobile's front wheels is less than the gravitational force tending to return the trailer to the horizontal position of FIG. 1. At this point, the trailer tilts back to the horizontal position, again slowed by the dashpot cylinder 104. In this connection, it should be noted that the wheels 20 are not exactly centered between the front and rear ends of the trailer, but are slightly to the rear of the midpoint. This is to ensure that the center of gravity of the empty trailer will be forward of the wheels 20, and the unloaded trailer therefore tends always to take the position shown in FIG. 1.

While I have shown and described in considerable detail what I believe to be the preferred form of the invention, it will be understood by those skilled in the art that the invention is not limited to such details, but could take various other forms within the scope of the claims.

I claim:

1. A mobile stand for supporting an automobile at an elevated height to enable a workman to work on the underside thereof, said stand comprising a trailer adapted to be towed by a towing vehicle, and said trailer including:

an open frame made up of fore-and-aft extending side members, and transversely extending front and back members, said frame being substantially free of any structural members extending between said side members and said front and back members that would interfere with work done on the underside of said automobile;

said frame being tiltable about said wheels between a first, horizontal position and a second rearwardly inclined position, the center-of-gravity of said frame being located ahead of said wheels so that the frame tends to tilt forwardly to said first position when unloaded;

A pair of laterally spaced, longitudinally extending tracks mounted on the top side of said frame at an elevated height such that when said automobile is standing on said tracks, there is ample room beneath the automobile to enable a workman to work on the underside thereof;

a draft frame pivotally connected to the front end of said first-named frame for vertical swinging movement relative thereto, said draft frame having means at the front end thereof for attaching it to a tow-hitch on said towing vehicle;

inclined ramp tracks connected to the rear ends of said first-named tracks for angular movement relative thereto, said ramp tracks being longitudinally aligned with said first-named tracks and extending downwardly and rearwardly therefrom to the ground at an angle such that said automobile can be driven up onto them;

said first-named frame having its rear end tilted downwardly to said second position when said automobile has its leading wheels driven part way up onto said ramp tracks;

said first-named frame tilting its front end downwardly again to said first position when the center-of-gravity of said automobile passes over said wheels of the trailer; and means for checking and cushioning the movement of said first-named frame from either one of its two positions to the other.

2. A mobile stand as in claim 1, wherein said tracks each comprise a pair of laterally spaced side rails, and a plurality of cross bars extending between said rails at longitudinally spaced intervals along the latter, said cross bars being fixedly attached at their ends to said side rails.

3. A mobile stand as in claim 1, wherein said means for checking and cushioning the movement of said first-named frame from either of its two positions to the other, comprises a hydraulic dashpot cylinder having one end connected to said draft frame and the other connected to said first-named frame at a distance from the pivotal connection of said draft frame to said first-named frame.

4. A mobile stand as in claim 1, which further includes a supporting leg at the front end of said first-named frame, said leg being pivoted for swinging movement between a ground-engaging position and an elevated transport position.

5. A mobile stand as in claim 1, wherein said wheels are journaled on fore-and-aft extending yokes pivoted on said side frames for vertical swinging movement; and spring means transferring the weight of said first-named frame to said yokes.

6. A mobile stand as in claim 1, wherein said wheels consist of two pairs of dual wheels, each pair being journaled on axles projecting laterally from opposite sides of a generally fore-and-aft extending yoke near one end thereof, said yoke being pivoted at its other end on said frame for vertical swinging movement; one wheel of each pair being on the outside of its respective side members and the other being on the inside; coil spring means between said wheels in each pair for transferring the weight of said first-named frame to said yoke; and shock absorber means for checking the spring action of said coil spring.

* * * * *

UNITED STATES PATENT OFFICE
CERTIFICATE OF CORRECTION

Patent No. 3,693,818        Dated September 26, 1972

Inventor(s)    Raymond E. Teagarden

It is certified that error appears in the above-identified patent and that said Letters Patent are hereby corrected as shown below:

Column 1, line 41, should read --are advantages in using the apparatus of the present invention instead of permanently installed hydraulic or electric lifts, or poured concrete pits. For one thing, the cost of the present apparatus is --.

Column 2, line 12, "of" should read --or--.

Column 7, line 2, "firstvnamed" should read --first-named--.

Signed and sealed this 13th day of February 1973.

(SEAL)
Attest:

EDWARD M. FLETCHER, JR.            ROBERT GOTTSCHALK
Attesting Officer                    Commissioner of Patents